United States Patent [19]
Blattner et al.

[15] 3,682,959
[45] Aug. 8, 1972

[54] BENZOTHIEPINO[4,5-C] PYRROLES

[72] Inventors: Hans Blattner, Schuetzenrainweg 42, Switzerland; Walter Schindler, Rudolf-Wackernagelstrasse, 4, both of Riehen/BS, Switzerland

[22] Filed: Dec. 16, 1970

[21] Appl. No.: 98,927

[30] Foreign Application Priority Data

Dec. 23, 1969 Switzerland............19061/69
Dec. 23, 1969 Switzerland............19062/69

[52] U.S. Cl..............260/326.9, 260/327 B, 424/274
[51] Int. Cl. ........................C07d 27/54, C07d 63/18
[58] Field of Search..................................260/326.9

[56] References Cited

UNITED STATES PATENTS 3,401,177  9/1968  Young et al. ............260/326.9

*Primary Examiner*—Alex Mazel
*Assistant Examiner*—Joseph A. Narcavage
*Attorney*—Karl F. Jorda and Bruce M. Collins

[57] ABSTRACT

Compounds of the class of 2,3-dihydro-1H-thieno[2',3<Y':2,3][1]benzothiepino[4,5-c]pyrrole,2,3-dihydro-1H-thieno[3',2':2,3][1]benzothiepino[4,5-c]pyrrole, and the N-allyl and N-alykl derivatives thereof are prepared from 4,5-bis-bromomethylthieno[3,2-b][1]benzothiepin or 4,5-bis-bromomethylthieno[3,2-b][1]benzothiepin and amines, these compounds and the pharmaceutically acceptable acid addition salts thereof have a depressant effect upon the central nervous system and are active ingredients of pharmaceutical compositions.

15 Claims, No Drawings

BENZOTHIEPINO[4,5-C] PYRROLES

DETAILED DESCRIPTION

The present invention relates to thiepin derivatives, to processes for their production, to pharmaceutical compositions comprising the compounds and to the use thereof.

More particular, the present invention relates to compounds of the formula

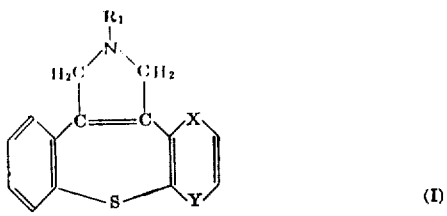

(I)

wherein
one of the symbols $x$ and $y$ is a sulfur atom and the other a direct bond between the two adjacent carbon atoms, and
$R_1$ is hydrogen, allyl or alkyl having at most four carbon atoms;
and the pharmaceutically acceptable acid addition salts thereof.

In the compounds of formula I, $R_1$ as alkyl group having at most four carbon atoms is, e.g., the methyl, ethyl, propyl, isopropyl, butyl, sec.butyl or isobutyl group.

Compounds of the formula I and the pharmaceutically acceptable acid addition salts thereof have valuable pharmacological properties. They exert, in particular, on oral, rectal, or parenteral administration a depressant effect upon the central nervous system. For example they reduce motility, inhibit conditioned reflexes, potentiate the effect of anaesthetics, lower the body temperature, exert an inhibiting action in the "test de la traction" and on the fighting mouse. They furthermore have in particular a muscle relaxing effect. Also antiemetic, adrenolytic and histamine-antagonistic actions can be shown. These properties of the compounds of formula I are determined by selected standard tests in experimental animals [cp. R.Domenjoz and W. Theobald, Arch.Int.Pharmacodyn.120,450 (1959), and W. Theobald et al., Arzneimittelforschung 17,561(1967CX].

Thus, merely by illustration, it is demonstrated that 2-ethyl-2,3-dihydro-1H-thieno[2',3':2,3][1]benzothiepino[d4,5-c]pyrrole, in form of the methanesulfonate addition salt, reduces orientation motility of mice upon intraperitoneal administration in amounts of about 0.012 mg/kg.

The same compound, subcutaneously administered in amounts of about 0.5 mg/kg to mice, anaesthetised intraperitoneally with 40mg/kg of the short-acting anaesthetic N,N-diethyl-2-methoxy-4-allyl-phenoxyacetic acid amide, potentiates, i.e., prolongs the effect of the anaesthetic to a very significant extent.

The same compound, subcutaneously administered in amounts of about 0.26 mg/kg to mice prevents about 50 percent of the animals hanging on to a wire with their front paws, from pulling up and gripping the wire with their hind paws(test de la traction).

Similar results are found with 2,3-dihydro-1H-thieno[2',3:2,3][1]benzothiepino[4,5-c]pyrrole, the 2-methyl-substituted derivative thereof and the 2-methyl-,2-ethyl-and 2-butyl-substituted 2,3-dihydro-1H-thieno[3',2':2,3][1]benzothiepino[4,5-c]pyrrole.

Although the methane sulfonate addition salts are preferred also other pharmaceutically acceptable acid addition salts can be used.

The pharmacological properties of the compounds of the invention in combination with a favorable low order of toxicity render them suitable for the treatment of states of tension and agitation of psychic and muscular genesis.

The compounds of the formula I are produced according to the invention by reacting compound of formula II,

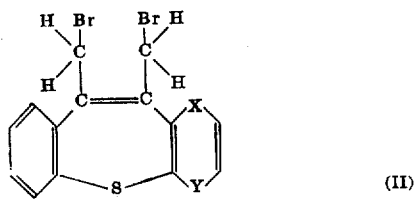

(II)

wherein X and Y have the meaning given in formula I, with an amine of the formula III,

(III)

wherein $R_1$ has the meaning given under formula I; and, optionally, converting the obtained reaction product with an inorganic or organic acid into an addition salt.

The bis-bromomethyl compound of formula II is reacted with the free bases of the formula III in the presence of a solvent. Suitable solvents are such which are inert under the reaction conditions, e.g., hydrocarbons such as benzene or toluene, halogenated hydrocarbons such as chloroform, lower alkanols such as methanol or ethanol, ethereal liquids such as ether or dioxane, lower alkanones such as acetone, methyl ethyl ketone or diethyl ketone, as well as mixtures of such solvents.

In the reaction according to the invention of one molar equivalent of bis-bromomethyl compound with one molar equivalent of free base, two molar equivalents of hydrogen bromide are split off. The hydrogen bromide is preferably bound by an excess of the base used. The reaction is performed at a temperature of ca. 10° to 100° C.

The starting material for the preparation of the compounds of formula Ia

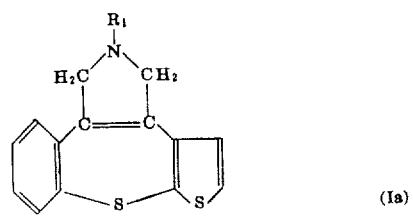

(Ia)

wherein $R_1$ has the meaning given in formula I, the 4,5-bis-bromomethylthieno[2,3-b][1]benzothiepin, of the formula IIa

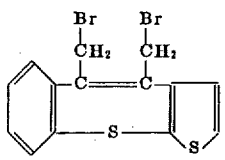

can be produced, e.g., starting with the thieno[2,3-b][1]benzothiepin-4(5H)-one described in the literature [cp.M.Rajsner et al., Farmaco(Pavia), Ed.Sci.23,140–48 (1968)]. This ketone is alkylated with a methyl halide, e.g., with methyl iodide, preferably in an inert solvent, e.g., in a mixture of benzene and toluene, in the presence of a condensation agent, e.g., sodium amide, to give 5-methylthieno[2,3-b][1]benzothiepin-4(5)-one. The alkylation product can be reacted according to Grignard with a methyl halide, e.g., with methyl iodide, in an inert solvent, e.g., in benzene, in the presence of magnesium to give 4,5-dimethyl-4,5-dihydrothieno[2,3-b][1]benzothiepin-4-ole. This compound is boiled with dilute acid, e.g., with diluted hydrochloric acid. The crude reaction product is subsequently converted with ethanolic potassium hydroxide solution into 4,5-dimethylthieno[2,3-b][1]benzothiepin. The dimethyl derivative can be brominated with N-bromosuccinimide in an inert solvent, e.g., carbon tetrachloride, in the presence of benzoyl peroxide to give the corresponding 4,5-bisbromomethyl derivative of formula IIa.

The starting material for the preparation of the compounds of formula Ib

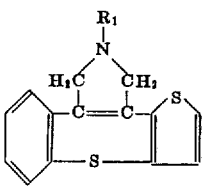

wherein $R_1$ has the meaning given in formula I, the 4,5-bisbromomethylthieno[3,2-b][1]benzothiepin of the formula IIb

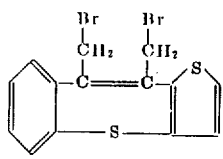

can be produced, e.g., starting with the thieno[3,2-b][1]benzothiepin-4(5H)-one described in the literature (cp.J.R. Geigy A.G., Belgian Pat. specification No.715,363). This ketone is alkylated with a methyl halide, e.g., with methyl iodide, preferably in an inert solvent, e.g., in a mixture of benzene and toluene, in the presence of a condensation agent, e.g., sodium amide, to give 5-methylthieno[3,2-b][1]benzothiepin-4(5)-one. The alkylation product can be reacted according to Grignard with a methyl halide, e.g., with methyl iodide, in an inert solvent, e.g., in benzene, in the presence of magnesium to give 4,5-dimethyl-4,5-dihydrothieno[3,2-b][1]benzothiepin-4-ole. This compound is boiled with dilute acid, e.g., with diluted hydrochloric acid. The crude reaction product is sub-sequently converted with ethanolic potassium hydroxide solution into 4,5-dimethylthieno[3,2-b][1]benzothiepin. The dimethyl derivative can be brominated with N-bromosuccinimide in an inert solvent, e.g., carbon tetrachloride, in the presence of benzoyl peroxide to the corresponding 4,5-bisbromomethyl derivative of formula IIb.

Using a second process according to the invention, a compound of the formula I of which the radical $R_1$ is hydrogen is obtained by hydrolysing a compound of the formula IV:

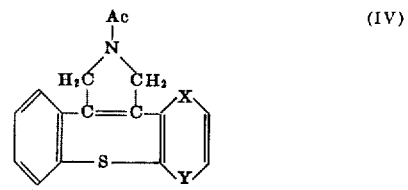

wherein X and Y have the meaning given under formula I, and Ac represents the acyl radical of an organic acid; and, optionally, converting an obtained compound of the formula I, wherein $R_1$ represents hydrogen, into an addition salt with an inorganic or organic acid.

As acyl radical in the starting materials of the formula IV, Ac is, in particular, the cyano or chlorocarbonyl group, an alkanoyl or arenecarbonyl group, or the radical of a monofunctional derivative of carbonic acid, thiocarbonic acid, or dithiocarbonic acid. Mentioned as examples are: for alkanoyl or arenecarbonyl groups the acetyl or benzoyl group, for radicals of monofunctional derivatives of carbonic acid, thiocarbonic acid or dithiocarbonic acid: the methoxycarbonyl, ethoxycarbonyl, tert.butoxycarbonyl, phenoxycarbonyl, benzyloxycarbonyl, methoxythiocarbonyl, ethoxythiocarbonyl, methylthiothiocarbonyl, or ethylthiothiocarbonyl group.

The hydrolysis of compounds of the formula IV is performed, e.g., by heating such compounds for several hours in an alkanolic or aqueous/alkanolic alkali hydroxide solution, e.g., by boiling in a mixture of potassium or sodium hydroxide with ethanol or methanol, and a little water. Instead of lower alkanols, it is also possible to use other solvents containing hydroxyl groups, such as ethylene glycol or its lower monoalkyl ethers. Furthermore, especially compounds of the formula IV wherein Ac is the cyano group can also be hydrolysed by being heated with a mineral acid in organic/aqueous or aqueous medium, e.g., by being boiled for several hours in a mixture of 85 percent phosphoric acid and formic acid, or by being heated for several hours in 48 percent hydrobromic acid to ca. 60° to 120°C.

The starting materials of the formula IV are for their part produced, e.g., from compounds of the formula V:

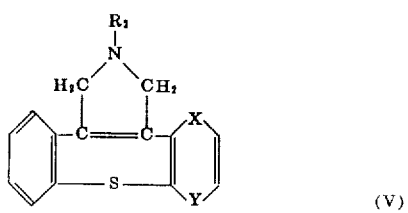

wherein X and Y have the meaning given under formula I, and R₂ represents a lower alkyl group, the allyl or benzyl group, by allowing to act on the stated compounds, at room temperature or at elevated temperatures, an organic acyl halide, e.g. a cyanogen halide, especially cyanogen bromide, also phosgene, a chloroformic acid alkyl ester, the chloroformic acid phenyl ester or -benzyl ester, the chloride or bromide of a lower alkanoic acid or of an arenecarboxylic acid, particularly acetyl chloride, acetyl bromide, or benzoyl chloride, whereby, according to the von Braun-reaction, the desired acylation occurs with liberation of an R₂-halide, e.g. an alkyl, allyl or a benzyl halide. The reaction is carried out in an inert organic solvent such as, e.g. chloroform or benzene, or optionally also in excess acyl halide.

Starting materials of the formula V are, on the other hand, produced analogously to the first process by reacting the compound of formula II with an amine of the general formula VI:

wherein
R₂ represents a lower alkyl group, the allyl or the benzyl group.

The production of the applied starting compound of formula II has been described following on the first process.

The compounds of the general formula I obtained by the process according to the invention can, optionally, be converted in the usual manner into their addition salts with inorganic and organic acids. For example, to a solution of a compound of the formula I in an organic solvent is added the acid desired as the salt component, or a solution of the acid. For the reaction are preferably chosen organic solvents in which the formed salt is difficultly soluble, so that it can be separated by filtration. Such solvents are, e.g. methanol, acetone, methyl ethyl ketone, acetone/ethanol, methanol/ether, or ethanol/ether. For use as medicaments it is possible to use, instead of free bases, pharmaceutically acceptable acid addition salts, i.e. salts with such acids of which the anions are not toxic in the case of the dosages in question. Furthermore, it is advantageous if the salts to be used as medicaments crystallize well and are not, or only slightly, hygroscopic. For salt formation with compounds of the formula I it is possible to use, e.g. hydrochloric acid, hydrobromic acid, sulphuric acid, phosphoric acid, methanesulphonic acid, ethanesulphonic acid, β-hydroxyethanesulphonic acid, acetic acid, malic acid, tartaric acid, citric acid, lactic acid, oxalic acid, succinic acid, fumaric acid, maleic acid, benzoic acid, salicyclic acid, phenylacetic acid, mandelic acid and embonic acid.

As already mentioned, the new active substances are administered orally, rectally, or parenterally. The dosage depends on the manner of administration, the species, the age, and on the individual condition. The daily dosages of the free bases or of pharmaceutically acceptable salts thereof vary between 0.1 mg/kg and 10 mg/kg for warm-blooded animals. Suitable dosage units, such as dragees, tablets, suppositories or ampoules, preferably contain 2–150 mg of an active substance according to the invention.

Dosage units for oral administration preferably contain as active substance between 1 and 90 percent of a compound of the formula I, or of a pharmaceutically acceptable salt of such a compound. They are produced by combining the active substance, e.g. with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate, or polyethylene glycols, to form tablets or dragee cores. The dragee cores are coated, e.g. with conc. sugar solutions which may also contain, e.g. gum arabic, talcum and/or titanium dioxide; or they are coated with a lacquer dissolved in readily volatile organic solvents or mixtures of solvents. Dyestuffs may be added to these coatings, e.g. for identification of the varying dosages of active substance.

Further dosage units suitable for oral administration are hard gelatine capsules, as well as soft closed capsules made from gelatine and a softener such as glycerin. The hard capsules contain the active substance preferably as a granulate, e.g. in admixture with fillers such as maize starch, and/or lubricants such as talcum or magnesium stearate, and, optionally, stabilizers such as sodium metabisulphite (Na₂S₂O₅), or ascorbic acid. In soft capsules, the active substance is preferably dissolved or suspended in suitable liquids such as liquid polyethylene glycols, whereby likewise stabilizers may be added.

Suitable dosage units for rectal administration are, e.g. suppositories consisting of a combination of an active substance with a fatty base. Also suitable are gelatine rectal capsules containing a combination of the active substance with polyethylene glycol.

Ampoules for parenteral administration, especially intramuscular administration, preferably contain as active substance a water-soluble salt in a concentration of preferably 0.5 – 5 percent, optionally together with suitable stabilizers and buffer substances, in aqueous solution.

The following examples further illustrate the production of compounds of formula I and of intermediate products not hitherto described, the examples in no way limit, however, the scope of the invention. The temperatures are given in degrees Centigrade.

EXAMPLE 1 a. An amount of 16 g of 4,5-bis-bromomethylthieno [2,3-b][1]benzothiepin is dissolved in 96 ml of abs. benzene. This solution is added dropwise at 40°, within 1 hour, to a solution of 37.5 g of methylamine in 225 ml of methanol. The reaction mixture is stirred for a further hour at 50°, and the solvent and the excess methylamine are subsequently distilled off. To the residue are added 50 ml of water, and the formed emulsion is extracted with ether. The ethereal solution is washed with water, dried over potassium carbonate, and concentrated by evaporation. The residue, 2-methyl-2,3-dihydro-1H-thieno[2',3':2,3][1]benzothiepino[4,5-c]pyrrole, is a viscous oil. An amount of 8.5 g of obtained crude base is dissolved in 40 ml of abs. acetone, and 3.0 g of methanesulphonic acid are carefully added, whereupon the methanesulphonate crystallizes out, which, after recrystallization from absolute ethanol, melts at 224°–225°; yield 9.5 g, 64 percent of the theoretical value.

The starting material is produced as follows:

b. To a solution of 290 g of thieno[2,3-b][1]benzothiepin-4(5H)-one [cp. M. Rajsner et al., Farmaco (Pavia), Ed.Sci. 23, 140-148 (1968)], M.P. 122°–123°, in 2,870 liters of absolute benzene is added dropwise, within 30 minutes, a suspension of 56 g of sodium amide in 130 ml of absolute toluene at 60°–70°; the mixture is then refluxed for 2 hours. The obtained suspension is thereupon cooled to 45°, and 281 g of methyl iodide are added dropwise within 1 hour, whereby the temperature is maintained between 40° and 45°. The reaction mixture is stirred for 40 hours at this temperature; a further 101 g of methyl iodide are then added, and the reaction mixture heated for a further 24 hours to 55°–60°; it is subsequently refluxed for 24 hours. The suspension is then cooled to 10°, and 30 ml of water are added. The organic phase is separated, washed with water, dried over sodium sulphate, and completely concentrated in vacuo. The residue, which is purified by fractionated crystallization from methanol, yields 5-methylthieno[2,3-b][1]benzothiepin-4(5H)-one, M.P. 107°–108°; yield 162 g, 53 percent of the theoretical value.

c. To a Grignard solution prepared from 30 g of magnesium, 400 ml of abs. ether and 172 g of methyl iodide is added dropwise in the course of two hours, with good stirring, a solution of 150 g of 5-methylthieno[2,3-b][1]benzothiepin-4(5H)-one in 600 ml of absolute benzene, whereby a reaction temperature of −5° to 0° is maintained. The reaction mixture is subsequently heated to 45°, and is stirred at this temperature for a further 15 hours. The mixture is then cooled to 0°, and is stirred into a solution of 340 g of ammonium chloride in 1 liter of ice water. The organic phase is separated, and the aqueous phase extracted with benzene. The combined organic solutions are washed with water, dried over sodium sulphate, and concentrated in vacuo. The residue, which is recrystallized from methanol, yields 4,5-dimethyl-4,5-dihydrothioeno[2,3-b][1]benzothiepin-4-ole, M.P. 118°–120°; yield 135 g, 84.5 percent of the theoretical value.

d. An amount of 135 g of 4,5-dimethyl-4,5-dihydrothieno[2,3-b][1]benzothiepin-4-ole is refluxed in 700 ml of 2-n hydrochloric acid for 5 hours with stirring. The mixture is then cooled to 20°, extracted with ether, the organic phase washed with water, dried over potassium carbonate, and concentrated by evaporation. The residue is dissolved in 675 ml of abs. ethanol; to the solution are then added 135 g of potassium hydroxide, and the mixture is afterwards refluxed for 36 hours. The reaction mixture is then poured on to water, and the crude product extracted with ether. The ether solution is washed with water, dried over potassium carbonate, and concentrated by evaporation. The residue, 4,5-dimethylthieno[2,3-b][1] benzothiepin, melts, after recrystallization from petroleum ether, at 69°–71; yield 94 g, 74.5 percent of the theoretical value.

e. An amount of 34 g of 4,5-dimethylthieno[2,3-b][1] benzothiepin is dissolved in 630 ml of carbon tetrachloride, and to the solution are added 49.5 g of N-bromosuccinimide and 0.35 g of dibenzoyl peroxide. By exposure to two 200-Watt lamps, or to a UV-lamp, the mixture is heated to boiling while stirring is maintained. The mixture is kept boiling until all the N-bromosuccinimide has been reacted, which takes about 2 hours. The reaction mixture is thereupon cooled to 20°, and is separated from the succinimide by filtration. The filtrate is washed with water, dried over sodium sulphate, and concentrated completely in vacuo. The residue, which is recrystallized from benzene, yields 4,5-bis-bromomethylthieno[2,3-b][1] benzothiepin, M.P. 131°–134°; yield 48 g, 86 percent of the theoretical value.

EXAMPLE 2

Analogously to Example 1a are produced the following final products:

a. from 5.5 g of 4,5-bis-bromomethylthieno[2,3-b][1] benzothiepin and 12 g of ethylamine in 75 ml of methanol: 2-ethyl-2,3-dihydro-1H-thieno[2′,3′:2,3][1]benzothiepino[d4,5-c]pyrrole (crude product), methane sulphonate: M.P. 205°–207° (from abs. ethanol); yield 3 g, 57 percent of the theoretical value;

b. from 6 g of 4,5-bis-bromomethylthieno[2,3-b][1]benzothiepin and 9.15 g of isopropylamine in 33 ml of methanol: 2-isopropyl-2,3-dihydro-1H-thieno[2′,3′:2,3][1]benzothiepino[4,5-c]pyrrole (crude product), methane sulphonate: M.P. 250°–252° (from abs. ethanol): yield 4.9 g, 83 percent of the theoretical value;

c. from 6 g of 4,5-bis-bromomethylthieno[2,3-b][1] benzothiepin and 9.15 g of propylamine in 33 ml of methanol: 2-propyl-2,3-dihydro-1H-thieno[2′,3′:2,3][1]benzothiepino[4,5-c]pyrrole (crude product), methane sulphonate: M.P. 220°–221° (from isopropanol), yield 4.9 g, 76 percent of the theoretical value;

d. from 6 g of 4,5-bis-bromomethylthieno[2,3-b][1] benzothiepin and 10.95 g of butylamine in 33 ml of methanol: 2-butyl-2,3dihydro-1H-thieno[2′,3′:2,3][1]benzothiepino[d4,5-c]pyrrole (crude product), methane sulphonate; M.P. 213°–215° (from abs. ethanol); yield 4.2 g, 68 percent of the theoretical value;

e. from 20.1 g of 4,5-bis-bromomethylthieno[2,3-b][1] benzothiepin and 28.5 g of allylamine in 74 ml of methanol: 2-allyl-2,3-dihydro-1H-thieno[2′,3′:2,3][1]benzothiepino [4,5-c]pyrrole, M.P. 95°–96° (from benzene; yield 10 g, 67.5 percent of the theoretical value; methane sulphonate: M.P. 222°–225° (from isopropanol)

f. from 12.0 g of 4,5-bis bromomethylthieno[2,3-b][1] benzothiepin and 21.9 g of isobutylamine in 66 ml of methanol: 2-isobutyl-2,3-dihydro-1H-thieno[2′,3′:2,3][1]benzothiepino [4,5-c]pyrrole, crude product; methanesulphonate: M.P. 225°–227° (from abs. ethanol); Yield 8.0 g, 65 percent of the theoretical value g. from 12.0 g of 4,5-bis-bromomethylthieno[2,3-b][1] benzothiepin and 21.9 g of sec. butylamine in 66 ml of methanol: 2-(2-butyl)-2,3-dihydro-1H-thieno[2′,3:2,3][1] benzothiepino[4,5-c]pyrrole, M.P.

104°–106° (from petroleum ether); Yield 7,3 g, 78 percent of the theoretical value; methane sulphonate: M.P. 238°–240° (from abs. ethanol).

EXAMPLE 3 a. An amount of 4.3 g of 2,3-dihydro-1H-thiono[2',3'2,3][1]benzothiepino[4,5-c]pyrrole-2-carboxylic acid ethyl ester is refluxed with a solution of 4.3 g of potassium hydroxide in 43 ml of abs. ethanol for one hour. The ethanol is then distilled off in vacuo from the reaction mixture. Water is added to the residue, and the crude product extracted with ether. The ethereal solution is washed with water, dried over potassium carbonate, and concentrated by evaporation. An amount of 1.83 g of crude 2,3-dihydro-1H-thieno[2',3'2,3][1]benzothiepino[4,5-c]pyrrole remains behind. The obtained crude base is dissolved in 30 ml of abs. acetone, and neutralized with 0.68 g of methanesulphonic acid, whereupon the methane sulphonate crystallizes out, which, after recrystallization from isopropanol, melts at 215°–218°; yield 2.5 g, 56 percent of the theoretical value.

The starting product is produced as follows:

b. An amount of 6 g of 2-allyl-2,3-dihydro-1H-thieno[2'c':2,3][1]benzothiepino[4,5-c]pyrrole is dissolved in 50 ml of abs. benzene, and the solution refluxed with stirring. A solution of 3.3 g of chloroformic acid ethyl ester in 50 ml of abs. benzene is added dropwise within 1 hour, and the formed allyl chloride simultaneously distilled off. After completion of the dropwise addition, boiling is continued for a further hour, and the solution cooled to room temperature. The reaction solution is washed with 2-n hydrochloric acid and then with water; it is afterwards dried over sodium sulphate, and concentrated in vacuo to a small volume, whereupon 2,3-dihydro-1H-thieno[2',3':2,3][1]benzothiepino[4,5-c]pyrrole-2-carboxylic acid ethyl ester, M.P. 156°–159°, crystallizes out; yield 5.5 g, 83 percent of the theoretical value.

EXAMPLE 4 a. An amount of 20.1 g of 4,5-bis-bromomethylthieno[3,2-b][1]benzothiepin is dissolved in 100 ml of abs. benzene. This solution is added dropwise crystallizes 40° within 1 hour, with stirring, to a solution of 46.5 g of methylamine in 280 ml of methanol. The reaction mixture is stirred for a further hour at 50°, and the solvent and the excess methylamine are subsequently distilled off. To the residue are added 65 ml of water, and the formed emulsion is extracted with ether. The ethereal solution is washed with water, dried over potassium carbonate, and concentrated by evaporation. The residue, 2-methyl-2,3-dihydro-1H-thieno[3',2':2,3][1]benzothiepino[4,5-c]pyrrole, is a viscous oil.

An amount of 6.25 g of the obtained crude base is dissolved in 35 ml of abs. acetone, and 2.22 g of methanesulphonic acid are carefully added, whereupon the methanesulphonate crystallizes out; this melts, after recrystallization from abs. ethanol/ether, at 217°–219°; yield 6.5 g, 35.5 percent of the theoretical value.

The starting material is produced as follows:

b. To a solution of 290 g of thieno[3,2-b][1]benzo-thiepin-4(5H)-one (cp. J.R. Geigy A.G., Belgian Patent No. 715 363), M.P. 138°–140°, in 2,870 liters of abs. benzene is added dropwise, within 30 minutes at 60°–70°, a suspension of 56 g of sodium amide in 130 ml of abs. toluene; the mixture is then refluxed for 2 hours. The obtained suspension is afterwards cooled to 45°, and 281 g of methyl iodide are added dropwise within 1 hour, whereby the temperature is maintained between 40° and 45°. The reaction mixture is stirred for a further 40 hours at this temperature; a further 101 g of methyl iodide are added and the reaction mixture is maintained for a further 24 hours at 55°–60°; it is then refluxed for 24 hours. The suspension is then cooled to 10°, and 300 ml of water are added dropwise. The organic phase is separated, washed with water, dried over sodium sulphate, and concentrated in vacuo. The residue, which is purified by fractionated crystallization from methanol, yields: 5-methylthieno[3,2-b][1]benzothiepin-4(5H)-one, M.P. 110°–111°; yield 168 g, 54.5 percent of the theoretical value.

c. To a Grignard solution prepared from 30 g of magnesium, 400 ml of abs. ether and 172 g of methyl iodide is added dropwise in the course of two hours, with good stirring, a solution of 150 g of 5-methylthieno[3,2-b][1]benzothiepin-4(5H)-one in 600 ml of abs. benzene, whereby a reaction temperature of −5° to 0° is maintained. The reaction mixture is subsequently heated to 45°, and is stirred at this temperature for a further 15 hours; the mixture is then cooled to 0°, and is stirred into a solution of 340 g of ammonium chloride in 1,000 ml of ice water. The organic phase is separated, and the aqueous phase extracted with benzene. The combined solutions are washed with water, dried over sodium sulphate, and concentrated in vacuo. Obtained as residue are 160 g of 4,5-dimethyl-4,5-dihydrothieno[3,2-b][1]benzothiepin-4-ole in the form of viscous oil.

d. An amount of 129 g of the crude product obtained according (c) is refluxed in 645 ml of 2-n hydrochloric acid for 5 hours while stirring is maintained. The mixture is then cooled to 20°, extracted with ether, the organic phase washed with water, dried over potassium carbonate, and concentrated by evaporation. The residue is dissolved in 645 ml of abs. ethanol; to the solution are then added 129 g of potassium hydroxide, and the mixture is refluxed for 36 hours. The reaction mixture is then poured on to water, and extracted with ether. The organic phase is washed with water, dried over potassium carbonate, and concentrated by evaporation. The residue, 4,5-dimethylthieno[3,2-b][1]benzothiepin, melts, after recrystallization from a solvent mixture of one part of ether and two parts of methanol, at 69°–70°; yield 70 g, 58.5 percent of the theoretical value.

e. An amount of 55 g of the compound obtained according to (d) is dissolved in 1,130 liters of carbon tetrachloride, and to the solution are added 81 g of N-bromosuccinimide and 0.56 g of dibenzoyl peroxide. By exposure to two 200-Watt lamps, or to a UV-lamp, the mixture is refluxed while stirring is maintained. Boiling proceeds until all the N-bromosuccinimide has been reacted, which takes about 30 minutes. The reaction mixture is then cooled to 20°, and is separated from the succinimide by filtration. The filtrate is washed with water, dried over sodium sulphate, and completely concentrated in vacuo. The residue, which is recrystallized from methanol, yields 4,5-bis-bromomethylthieno[3,2f-b][1]benzothiepin, M.P.

100°–102°; yield 68 g, 75 percent of the theoretical value.

EXAMPLE 5

Analogously to Example 1a are produced the following final products:

a. from 10.0 g of 4,5-bis-bromomethylthieno[3,2-b][1]benzothiepin and 22.5 g of ethylamine in 100 ml of methanol: crude 2-ethyl-2,3-1H-thieno[3',2':2,3][1]benzothiepino [4,5-c]pyrrole; methane sulphonate, M.P. 208°–210° (from abs. ethanol); yield 3.1 g, 32.6 percent of the theoretical value;

b. from 10.0 g of 4,5-bis-bromomethylthieno[3,2-b][1]benzothiepin and 14.8 g of isopropylamine in 55 ml of methanol; crude 2-isopropyl-2,3-dihydro-1H-thieno[3'ʙ':2,3][1]benzothiepino[4,5-c]pyrrole; methane sulphonate, M.P. 232°–234' (from isopropanol); yield 4.4 g, 45 percent of the theoretical value;

c. from 10.0 g of 4.5-bis-bromomethylthieno[3,2-b][1]benzothiepin and 14.8 g of propylamine in 55 ml of methanol: crude 2-propyl-2,3-dihydro-1H-thieno[3',2':2,3][1]benzothiepino[4,5-c]pyrrole; methane sulphonate, M.P. 211°–213° (from abs. ethanol/ether); yield 4.5 g, 45.5 percent of the theoretical value;

d. from 10.0 g of 4,5-bis-bromomethylthieno[3,2-b][1]benzothiepin and 18.25 g of butylamine in 55 ml of methanol: crude 2-butyl-2,3-dihydro-1H-thieno[3',2':2,3][1]benzothiepino[4,5-c]pyrrole; methane sulphonate, M.P. 206°–208° (from abs. ethanol/ether); yield 4.4 g, 43 percent of the theoretical value; and e. from 22.1 g of 4,5-bis-bromomethylthieno[3,2-b][1]benzothiepin and 31.5 g of allylamine in 100 ml of methanol: crude 2-allyl-2,3-dihydro-1H-thieno[3',2':2,3][1]benzothiepino[4,5-c]pyrrole; methane sulphonate, M.P. 217°–220° (from abs. ethanol/ether); yield 11.5 g, 53.5 percent of the theoretical value.

EXAMPLE 6 a. An amount of 3.5 g of 2,3-dihydro-1H-thieno[3',2'2,3][1]benzothiepin[4,5-c]pyrrole-2-carboxylic acid ethyl ester is refluxed with a solution of 3.5 g of potassium hydroxide in 35 ml of abs. ethanol for 4 hours. The ethanol is then distilled off in vacuo from the reaction mixture. Water is added to the residue, and the suspension is extracted with ether. The ethereal solution is washed with water, dried over potassium carbonate, and concentrated by evaporation. Remaining as residue is: 2,3-dihydro-1H-thieno[3',2':2,3][1]benzothiepino[4,5]pyrrole as crude product.

An amount of 2 g of the crude base is dissolved in 20 ml of abs. acetone, and the solution neutralized with 0.75 g of methanesulphonic acid, whereupon methane sulphonate crystallizes out, which, after recrystallization, melts at 210°–212°; yield 1.7 g, 45.5 percent of the theoretical value.

The starting compound is produced as follows:

b. An amount of 6.0 g of 2-allyl-2,3-dihydro-1H-thieno [3',2':2,3][1]benzothiepino[4,5-c]pyrrole is dissolved in 50 ml of abs. benzene, and the solution heated to boiling whilst being stirred. A solution of 3.3 g of chloroformic acid ethyl ester in 50 ml of abs. benzene is then added dropwise within one hour, the formed allyl chloride simultaneously distilled off, and refluxing continued for a further hour. The benzene solution cooled to room temperature is washed with 2-n hydrochloric acid and then with water; it is afterwards dried over sodium sulphate, and concentrated in vacuo to a small volume, whereupon 2,3-dihydro-1H-thieno[3',2':2,3][1]benzothiepino[4,5-c]pyrrole-2-carboxylic acid ethyl ester, M.P. 121°–124°, crystallizes out; yield 5.56 g, 84 percent of the theoretical value.

EXAMPLE 7

An amount of 250 g of 2,3-dihydro-1H-thieno [2',3':2,3][1]benzothiepino[4,5-c]pyrrole methanesulphonate is mixed with 175.80 g of lactose and 169.70 g of potato starch; the mixture is then moistened with an alcoholic solution of 10 g of stearic acid, and granulated through a sieve. After the granulate has dried, 160 g of potato starch, 200 g of talcum, 2.50 g of magnesium stearate and 32 g of colloidal silicon dioxide are mixed in; the mixture is then pressed to form 10,000 tablets each weighing 100 mg and each containing 25 mg of active substance. If required the tablets can be provided with grooves for a more precise adjustment of the dosage amount.

EXAMPLE 8

A granulate is produced from 250 g of 2,3-dihydro-1H-thieno[2',3':2,3][1]benzothiepino[4,5-c]pyrrole methanesulphonate, 175.90 g of lactose, and the alcoholic solution of 10 g of stearic acid; after drying, the granulate is mixed with 56.60 g of colloidal silicon dioxide, 165 g of talcum, 20 g of potato starch and 2.50 g of magnesium stearate; and the mixture pressed to form 10,000 dragee cores. These are subsequently coated with a concentrated syrup made from 502.28 g of crystallized saccharose, 6 g of shellac, 10 g of gum arabic, 0.22 g of dyestuff, and 1.5 g of titanium dioxide, and then dried. The obtained dragees each weigh 120 mg and each contain 25 mg of active substance.

EXAMPLE 9

To produce 1,000 capsules each containing 25 mg of active substance, 25 g of 2,3-dihydro-1H-thieno[2',3':2,3][1]benzothiepino[4,5-c]pyrrole methanesulphonate are mixed with 248 g of lactose; the mixture is evenly moistened with an aqueous solution of 2 g of gelatine, and is then granulated through a suitable sieve (e.g. Sieve III according to Ph.Helv. V). The granulate is mixed with 10 g of dried maize starch and 15 g of talcum, and the mixture is evenly filled into 1,000 hard gelatine capsules, size 1.

EXAMPLE 10

A suppository foundation substance is prepared from 2.5 g of 2,3-dihydro-1H-thieno[2',3':2,3][1]benzothiepino[4,5]pyrrole methanesulphonate and 167.5 g of adeps solidus; it is then used to fill 100 suppositories each containing 25 mg of active substance.

EXAMPLE 11

A solution of 25 g of 2,3-dihydro-1H-thieno[2',3':2,3][1]benzothiepino[4,5-c]pyrrole methanesulphonate in one liter of water is filled into 1,000 ampoules, and then sterilized. An ampoule contains a 2.5 percent solution of 25 mg of active substance.

EXAMPLE 12

An amount of 250 g of 2-ethyl-2,3-dihydro-1H-thieno [3',2':2,3][1]benzothiepinol[4,5-c]pyrrole methanesulphonate is mixed with 175.80 g of lactose and 169.70 g of potato starch; the mixture is then moistened with an alcoholic solution of 10 g of stearic acid, and granulated through a sieve. After the granulate has dried, 160 g of potato starch, 200 g of talcum, 2.50 g of magnesium stearate and 32 g of colloidal silicon dioxide are mixed in; the mixture is then pressed to form 10,000 tablets each weighing 100 mg and each containing 25 mg of active substance. If required, the tablets can be provided with grooves for a more precise adjustment of the dosage amount.

EXAMPLE 13

A granulate is produced from 250 g of 2-ethyl-2,3-dihydro-1H-thieno[3',2':2,3][1]benzothiepino[4,5-c]pyrrole methanesulphonate, 175.90 g of lactose, and the alcoholic solution of 10 g or stearic acid; after drying the granulate is mixed with 56.60 g of colloidal silicon dioxide, 165 g of talcum, 20 g of potato starch and 2.50 g of magnesium stearate; and the mixture pressed to form 10,000 dragee cores. These are subsequently coated with a concentrated syrup made from 502.28 g of crystallized saccharose, 6 g of shellac, 10 g of gum arabic, 0.22 g of dyestuff, and 1.5 g of titanium dioxide, and then dried. The obtained dragees each weigh 120 mg and each contain 25 mg of active substance.

EXAMPLE 14

To produce 1,000 capsules each containing 25 mg of active substance, 25 g of 2-ethyl-2,3-dihydro-1A-thieno[3'ʙ':2,3][1]benzothiepino[4,5-c]pyrrole methanesulphonate are mixed with 248 g of lactose; the mixture is evenly moistened with an aqueous solution of 2 g of gelatine, and is then granulated through a suitable sieve (e.g. Sieve III according to Ph.Helv. V). The granulate is mixed with 10 g of dried maize starch and 15 g of talcum, and the mixture is evenly filled into 1,000 hard gelatine capsules, size 1.

EXAMPLE 15

A suppository foundation substance is prepared from 2.5 g of 2-ethyl-2,3-dihydro-1H-thieno[3',2':2,3][1]benzothiepino[d4,5c]pyrrole methanesulphonate and 167.5 g of adeps solidus; it is then used to fill 100 suppositories each containing 25 mg of active substance.

EXAMPLE 16

A solution of 25 g of 2-ethyl-2,3-dihydro-1H-thieno[3'ʙ':2,3][1]benzothiepino[4,5-c]pyrrole methane-sulphonate in one liter of water is filled into 1,000 ampoules, and then sterilized. An ampoule contains a 2.5 percent solution of 25 mg of active substance.

It is also possible to use, as active substance for tablets, dragees, capsules, suppositories and ampoules, the same amount of the following compounds:

2-Methyl-2,3-dihydro-1H-thieno[3',2':2,3][1]benzothiepino[4,5-c]pyrrole methanesulphonate
2-Butyl-2,3-dihydro-1H-thieno[3',2':2,3][1]benzothiepino[4,5-c]pyrrole methanesulphonate
2-Methyl-2,3-dihydro-1H-thieno[2',3':2,3][1]benzothiepino[4,5-c]pyrrole methanesulphonate
2-Ethyl-2,3-dihydro-1H-thieno[2',3':2,3][1]benzothiepino[4,5-c]pyrrole methanesulphonate.

What is claimed is:

1. A compound of the formula I

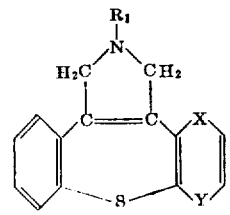

(I)

wherein
one of the symbols X--and--Y is a sulfur atom and the other a direct bond between the two adjacent carbon atoms and
$R_1$ is hydrogen, allyl or alkyl having at most four carbon atoms, and the pharmaceutically acceptable acid addition salts thereof.

2. A compound according to claim 1 having formula Ia

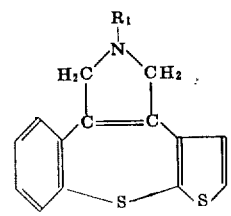

(Ia)

and the pharmaceutically acceptable acid addition salts thereof.

3. A compound according to claim 1 having formula Ib

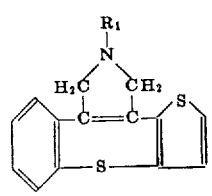

(Ib)

and the pharmaceutically acceptable acid addition salts thereof.

4. The compound according to claim 1 which is 2,3-dihydro-1H-thieno[2',3':2,3][1]benzothiepino[4,5-c]-pyrrole.

5. The methanesulfonate of the compound according to claim 4.

6. The compound according to claim 1 which is 2-methyl-2,3-dihydro-1H-thieno[2',3':2,3][1]-benzothiepino[4,5-c]pyrrole.

7. The methanesulfonate of the compound according to claim 6.

8. The compound according to claim 1 which is 2-ethyl-2,3-dihydro-1H-thieno[2',3':2,3][1]benzothiepino-[4,5-c]pyrrole.

9. The methanesulfonate of the compound according to claim 8.

10. The compound according to claim 1 which is 2-methyl-2,3-dihydro-1H-thieno[3',2':2,3][1]-benzothiepino[4,5-c]pyrrole.

11. The methanesulfonate of the compound according to claim 10.

12. The compound according to claim 1 which is 2-ethyl-2,3-dihydro-1H-thieno[3',2':2,3][1]-benzothiepino[4,5-c]pyrrole.

13. The methanesulfonate of the compound according to claim 12.

14. The compound according to claim 1 which is 2-butyl.2,3.dihydro-1H-thieno[3',2':2,3][ ]-benzothiepino[4,5-c]pyrrole.

15. The methanesulfonate of the compound according to claim 14.

* * * * *

UNITED STATES PATENT OFFICE
CERTIFICATE OF CORRECTION

Patent No. 3,682,959                     Dated  August 8, 1972

Inventor(s)  HANS BLATTNER ET AL

It is certified that error appears in the above-identified patent and that said Letters Patent are hereby corrected as shown below:

Column 1, insert

-- [73] Assignee: CIBA-GEIGY Corporation --;

Column 16, line 2, after "-thieno[3',2':2,3]["

insert -- 1 --

Signed and sealed this 5th day of March 1974.

(SEAL)
Attest:

EDWARD M. FLETCHER, JR.
Attesting Officer

C. MARSHALL DANN
Commissioner of Patents